United States Patent [19]
Johansson et al.

[11] Patent Number: 5,418,837
[45] Date of Patent: May 23, 1995

[54] METHOD AND APPARATUS FOR UPGRADING CELLULAR MOBILE TELEPHONES

[75] Inventors: Kjell Johansson, Bjärred; Mats E. G. Lindoff, Lund, both of Sweden

[73] Assignee: Ericsson-GE Mobile Communications Inc., Research Triangle Park, N.C.

[21] Appl. No.: 99,325

[22] Filed: Jul. 30, 1993

[51] Int. Cl.⁶ ............... H04M 11/00; H04M 1/00
[52] U.S. Cl. .................. 379/58; 379/357; 455/186.1
[58] Field of Search ............ 379/58, 61, 355, 356, 379/96, 95, 357, 144; 455/186.1

[56] References Cited

U.S. PATENT DOCUMENTS

| | | | |
|---|---|---|---|
| 4,805,211 | 2/1989 | Brennan et al. | 379/355 |
| 4,968,864 | 11/1990 | Doi et al. | |
| 5,038,273 | 8/1991 | Ito et al. | |
| 5,061,845 | 10/1991 | Pinnavaia | |
| 5,193,053 | 3/1993 | Sonobe | |
| 5,200,954 | 4/1993 | Teel, Jr. et al. | |
| 5,212,368 | 5/1993 | Hara | |
| 5,257,414 | 10/1993 | Trahan et al. | 379/357 |
| 5,266,782 | 11/1993 | Alanara et al. | 379/144 |

*Primary Examiner*—Curtis Kuntz
*Assistant Examiner*—Michael B. Chernoff
*Attorney, Agent, or Firm*—Burns, Doane, Swecker & Mathis

[57] ABSTRACT

An apparatus for upgrading a mobile telephone, the mobile telephone having a main memory the apparatus comprising a module reader provided in the mobile telephone and a software upgrading module card adapted to be temporarily connected to the mobile telephone by insertion into the module reader. The card comprises means for storing upgrading software to be transmitted into the main memory in the mobile telephone. The apparatus further includes means provided in the mobile telephone for transmitting the upgrading software into the main memory.

23 Claims, 3 Drawing Sheets

METHOD AND APPARATUS FOR UPGRADING CELLULAR MOBILE TELEPHONES

BACKGROUND

The present invention is directed to a method of upgrading mobile cellular telephones, in particular a method of upgrading mobile cellular telephones using a Software Upgrading Module (SUM) card. The SUM card may be used in the holder with connector (the SIM card reader) provided in mobile telephones designed for Subscriber Identity Module (SIM) card.

Periodically, it is necessary to upgrade the software in mobile cellular telephones. Such upgrading may consist of providing, for example, new and better or corrected software, customizing the mobile telephone to the special needs of the subscriber, or updating the telephone with a new capability, for example, pagers for other services that will be offered in any other network, local or globe.

Currently, cellular mobile telephones used in the GSM (Global System for Mobile communications) mobile telephone network in place in Europe are purchased independently of the cellular network operator. The subscriber then purchases a card which is permanently installed in a SIM card reader provided on the mobile telephone. The SIM card looks like a normal size credit card (or it may be a much smaller card for use in hand-held phones), but contains a complete microcomputer with memory. The SIM card, once installed in the telephone, checks if the subscription is valid and the card is not stolen, by authenticating the call with the home database. The SIM card may also include the ability to store user information such as a list of short codes for dialing commonly used numbers.

When the subscriber desires to upgrade his terminal or his mobile telephone to provide new features or network, etc., he must bring or send the telephone to the company responsible for service and updating. The mobile telephone is then physically connected via a galvanic, magnetic, optic or other hardwire connection to a computer located at that service company. The necessary software is fed into the mobile telephone through the hardwired connection. Alternatively, a memory unit inside the mobile telephone could be replaced by a technician at the company responsible for service and updating. In either case, subscribers must make a trip to the company or send their telephone to the company to obtain performance upgrades, software corrections, etc.

From another point of view, the service and updating company must provide a service or other department which will receive and keep track of mobile telephones sent by mail or brought in by the subscriber for the purpose of upgrading. This is inconvenient for both the company and the subscriber and is also very expensive.

In the United States, in order to upgrade a mobile telephone, the subscriber must bring the mobile telephone to a service center for upgrading via a hardware connection.

U.S. Pat. No. 5,061,845 to Pinnavaia discloses a removable memory card which includes semiconductor devices on the substrate and which is about the size of a credit card. The memory card is readily handled by the user and pluggable in the desired equipment. The patentee distinguishes his invention from memory expansion by using additional memory cards plugged into ports on the side of a personal computer cabinet, or additional Single In-line Module cards which must be installed in difficult to reach locations on the mother board while the computer is powered down. The Pinnavala memory card is for use in personal computers, game controllers or laser printers.

U.S. Pat. No. 5,212,368 to Hara discloses a toy including a card reading unit for use with a card that has game parameter data stored thereon in machine readable form. Other data cards for various applications are also known. See, for example, U.S. Pat. Nos. 5,193,053, 5,038,273, and 4,968,864. However, none of these patents disclose a method and apparatus for upgrading mobile cellular telephones using a temporarily installed SUM card.

SUMMARY

It is accordingly an object of the present invention to provide a method and apparatus for upgrading mobile telephones in a better and more efficient way to overcome the disadvantages discussed above.

It is a further object of the present invention to provide a method and apparatus for upgrading mobile telephone terminals which can be distributed to subscribers by mail.

It is a further object of the present invention to provide a method and apparatus for upgrading mobile telephones which can be used by the subscriber at his convenience.

According to one embodiment of the present invention, an apparatus is provided for upgrading a mobile telephone, the mobile telephone having a main memory, the apparatus comprising a module reader provided in the mobile telephone and a software upgrading module card adapted to be temporarily connected to the mobile telephone by insertion into the module reader. The card comprises means for storing upgrading software to be transmitted into the main memory in the mobile telephone. The apparatus further includes means provided in the mobile telephone for transmitting the upgrading software into the main memory.

According to one embodiment of the present invention, a method is provided of upgrading a mobile telephone comprising the steps of temporarily inserting a software upgrading module card in a module card reader of the mobile telephone, and upgrading software in a memory provided in the mobile telephone from software stored in a memory provided in the software upgrading module card.

According to one embodiment of the present invention, a method is provided of upgrading a mobile telephone comprising the steps of detecting whether a temporary upgrading software upgrading module card is inserted in a module card reader of the mobile telephone, and if yes, upgrading software stored in a memory of the mobile telephone from software stored in the temporary upgrading software upgrading module card.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which.

DETAILED DESCRIPTION

Figure 1A:
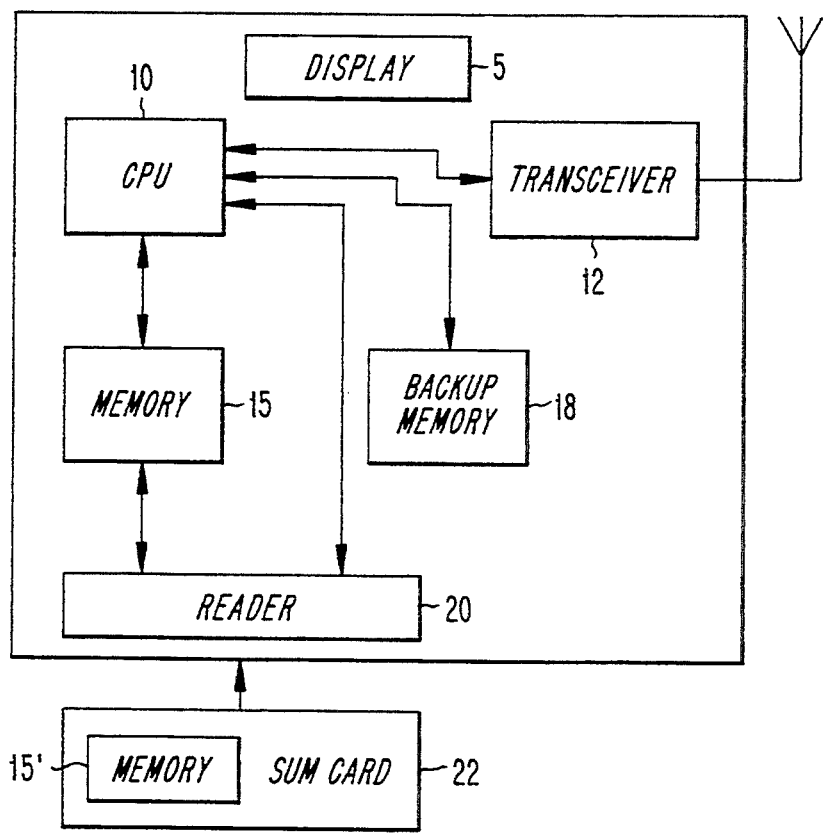
FIG. 1A is a block diagram of a mobile telephone and a SUM card according to a preferred embodiment of the present invention.

The present application is applicable in any radio communication system where the mobile telephone terminals are equipped with a SIM card reader or any other type of reader for user easily accessible and removable hardware. Currently, every GSM terminal is equipped with a SIM card reader, according to the GSM specifications. If in the future, U.S. mobile telephone terminals are modified to include a SIM card reader or other type of module card reader, it is contemplated that the present invention would be used in U.S. mobile telephones as well. For exemplary purposes, the invention will be described in a GSM mobile telephone embodiment. Further, if the terminal is equipped with any other type of easily accessible and removable hardware, "SIM card" or "SUM card" as used in this description will mean this type of hardware.

According to a preferred embodiment of the present invention, suitable software is provided inside the mobile telephone terminal and corresponding SUM (Software Upgrading Module) card. The particular upgrading software included in the SUM card is defined based on the need for upgrading the memory in this GSM terminal. That is, some or all of the controlling software in the mobile telephone may be replaced due to corrections and/or updates. The term "upgrading" is used herein to refer to providing new software to the mobile telephone, whether that software relates to changes or corrections to existing software or to software providing new features or adding access to new functions.

The term "SUM" is a new terminology, defined in this document. SUM is an acronym for "Software Upgrading Module". According to one embodiment of the present invention, the SUM card has the same physical dimensions as a SIM card, currently known in the GSM system. But internally the SIM card and the SUM card are two quite different devices. The SUM card, according to one embodiment, includes only memory, preferably a ROM, though other memories may be used, which can be read by the computer in the cellular telephone terminal or mobile telephone. According to another embodiment, the SUM may also include a microprocessor and/or a battery or other power source. The memory data in the SUM card may consist of different types of data. In the same SUM card, one, some or all of the following types of data may be stored:

identification data for the individual SUM card;
identification data telling which types of terminal that can be upgraded using that SUM card;
data concerning warranty information;
data concerning allowed time period for use of features that will be accessed after upgrading, for example, the user may be able to purchase a special service for a limited time period;
identification data telling the terminal the type of data stored in the SUM, that is, if the SUM card is designed for upgrading software, adding new features, etc.;
upgrading data;
checksum or check data area; and/or
a data area that can be altered during or after a complete upgrading procedure, which area can be part of or identical with one or more of the other data areas, for example, the data for allowed time period for use can be altered to zero after upgrading of the terminal.

Cellular telephones are still being developed today. Users of cellular telephones continually ask for new qualities which implementation can not be done using only the above mentioned types of data. It is considered part of this invention that other types of data required in the future to implement these new qualities and features may be stored in the SUM card according to the present invention.

According to a preferred embodiment of the present invention, any subscriber would be able to upgrade his mobile cellular telephone terminal by using this upgrading SUM card. In this way, instead of being forced to receive the mobile telephone from every subscriber that wants or needs to upgrade his mobile telephone, the manufacturer of such mobile telephones or the company responsible for service or upgrading can distribute any type of upgrading software by mail. This will provide better service to subscribers and lower cost than existing techniques.

FIG. 1A illustrates, in block diagram form, a mobile telephone terminal 1. The telephone 1 includes CPU 10 for controlling functions of the mobile telephone, a display 5 for displaying information to the user and a transceiver 12 for sending and receiving telephone communications. A main memory 15 is provided for storing programs used by the mobile telephone. Mobile telephone 1 also includes a module reader 20 which can read a SIM card, a SUM card 22 according to the present invention, or other removable memory elements. According to one embodiment of the present invention, SUM card 22 includes only a memory 15' for storing the upgrading software. However, other configurations of the SUM card are possible as will be described with respect to FIG. 1B. The SUM card according to the present invention will have the same dimensions as currently known GSM SIM cards.

According to one embodiment of the present invention, a backup memory 18 may be provided to reduce the risks of malfunctions or errors due to changing software. The backup memory can be arranged for the entire contents of memory 15 or any part thereof. The backup memory 18 may be a separate memory unit as shown in FIG. 1A, or it may be a separate backup area provided in the memory 15 (not shown). In this area, only verified versions of the different information blocks will be written. If a malfunction or error takes place in the normal memory area, for example, as a result of an incorrect transmission from the SUM card, the information in the backup memory 18 will override the false information. This will be supervised by an error routine provided in the mobile telephone for handling malfunctions.

The backup memory may be of any type. According to a preferred embodiment, the memory is a flash memory or EEPROM or another similar non-volatile memory. The memory may consist of one or more memory elements, for example, IC circuits.

Figure 1B:
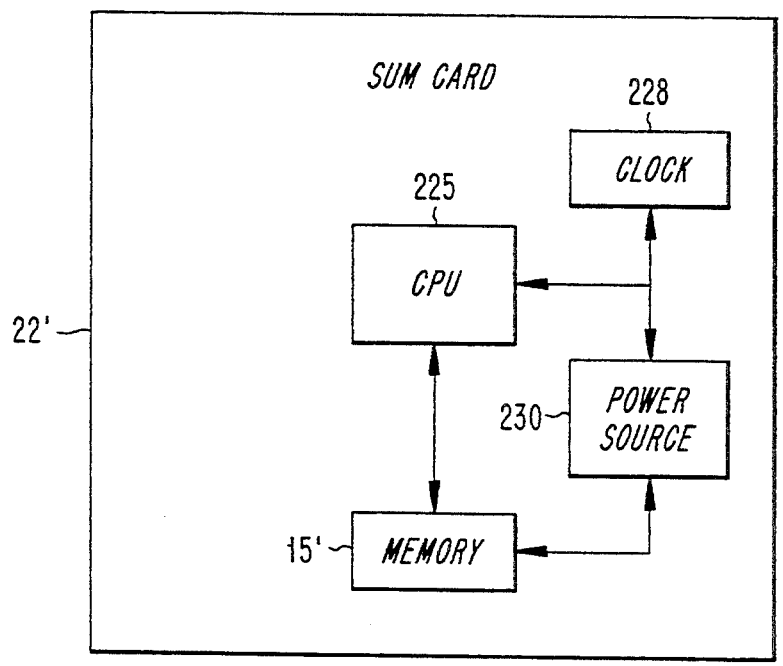
FIG. 1B is a block diagram of a SUM card according to one embodiment of the present invention.

FIG. 1B is a block diagram of a SUM card 22' according to another embodiment of the present invention. In this embodiment, a more "intelligent" SUM card 22' is provided which consists of a memory and a microprocessor and/or an optional battery, which card is in the same physical shape as currently known SIM cards. The microprocessor (CPU 225) can perform the functions of verifying that upgrading is being done for the correct mobile telephone and increasing the reliability of the transfer of data into the mobile telephone from the SUM card.

The first function of verifying that the correct telephone is being upgraded involves a hand-shaking procedure, with or without encryption, between the microprocessor (CPU 10) in the telephone and the CPU 225 on the SUM card 22'. Only after the hand-shaking procedure is completed and the CPU 225 is satisfied that the correct telephone is being updated, does the procedure for upgrading, described in FIG. 3, begin. The hand-shaking could involve, for example, the checking of the telephone identification number stored in the memory 15 of the telephone against an identification number stored in the memory 15' at the time the SUM card 22' is sent to the user. Other embodiments of the hand-shaking procedure are believed to be within the skill of the ordinary artisan in possession of this disclosure.

The second function of increasing reliability of the transfer of data can be implemented by programming the program executed by the telephone CPU 10 to repeat the information received from the SUM card 22' back to the SUM card 22'. The CPU 225 in the SUM card 22' can then be used to check that correct data is transferred into the telephone by comparing the data received from the telephone with the data stored in the SUM memory 15'. In the case of an error, the CPU 225 in the SUM card 22' can order a new data transfer. The implementation of this operation will decrease the need for the backup memory 18 in the telephone.

As seen in FIG. 1B, the SUM card 22' may also include a power source 230. According to one embodiment of the present invention, this power source consists of a battery. The battery is not necessary to power the CPU 225 in the SUM card 22' because the CPU 225 can be powered from the telephone in all normal modes of operation. However, if the SUM card 22' is equipped with some kind of electric power source, a real time clock 228 can be included, for example, to give the information in the SUM card 22' a limited lifetime.

Figure 2A:
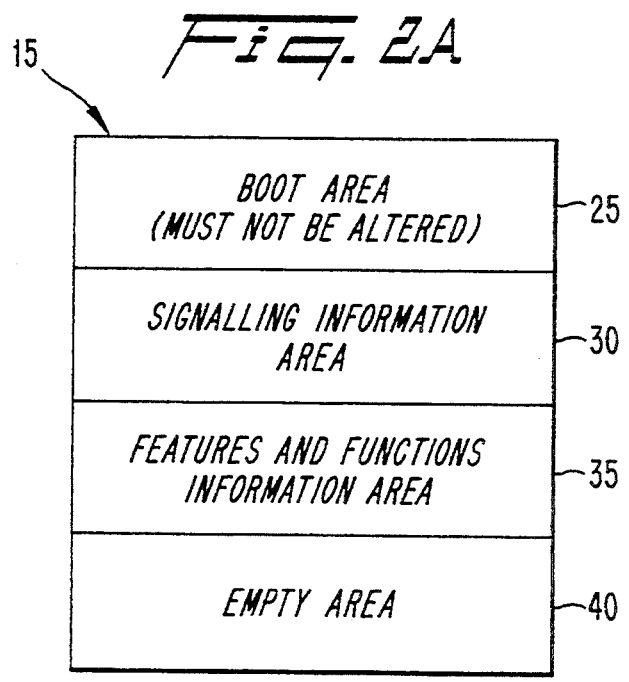
FIGS. 2A and 2B are block diagram representations of the organization of a memory in the mobile cellular telephone and a memory in the SUM card, respectively, according to one embodiment of the present invention.

FIG. 2A illustrates one way to organize the memory 15 in the mobile telephone according to an embodiment of the present invention. It is understood that this is not the only way that such memory may be organized to accomplish the present invention, but is shown for exemplary purposes only.

The memory 15 includes a boot area 25 which must not be altered or changed by the control software. This boot area is used to start the functions of the mobile telephone 1. The signaling area 30 stores information relating to the signaling carded out between the mobile telephone and the base stations in the mobile telephone network. The features and functions information area 35 stores information relating to the functions and features provided in the particular mobile telephone including those functions and features provided currently and those which may be provided in the future. The empty area 40 is provided for expandability of the features and functions of the mobile telephone.

It is envisioned that the functions and features stored in the features information area 35 in the future may include, for example, voice activated dialing (VAD); hands free functions, either duplex or simplex (HF); data transmission including receiving and/or transmitting and vice versa; facsimile transmission; automatic answering machine service; short message service function (SMS); changing the mobile telephone into a home base telephone equipment; and/or using an internal or external loud speaker. Other features may be developed over time which can be added to upgrade the mobile telephones using the SUM card according to the present invention.

Figure 2B:
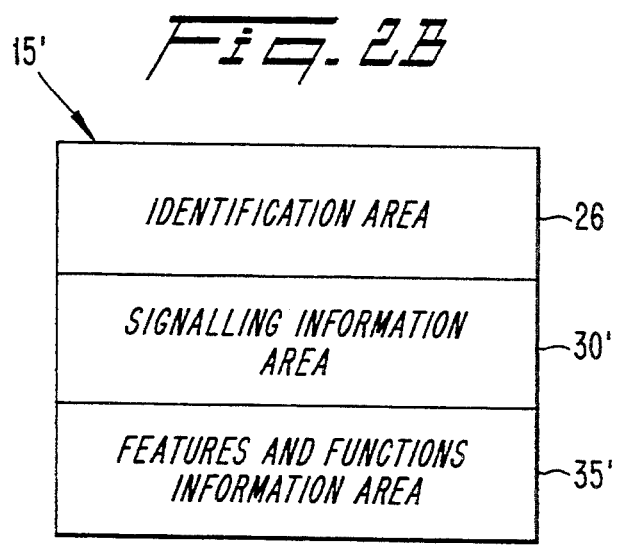

FIG. 2B illustrates one way to organize the SUM card memory 15'. It is understood that this is not the only way that such memory may be organized to accomplish the prevent invention, but is shown for exemplary purposes only.

The memory 15' includes an identification area 26 which stores information relating to the identification of the card as a SUM card valid for upgrading purposes. The signalling information area 30' and features and functions information area 35' store signalling and feature and function information to be transmitted to the corresponding areas 30 and 35 of memory 15.

Figure 3:
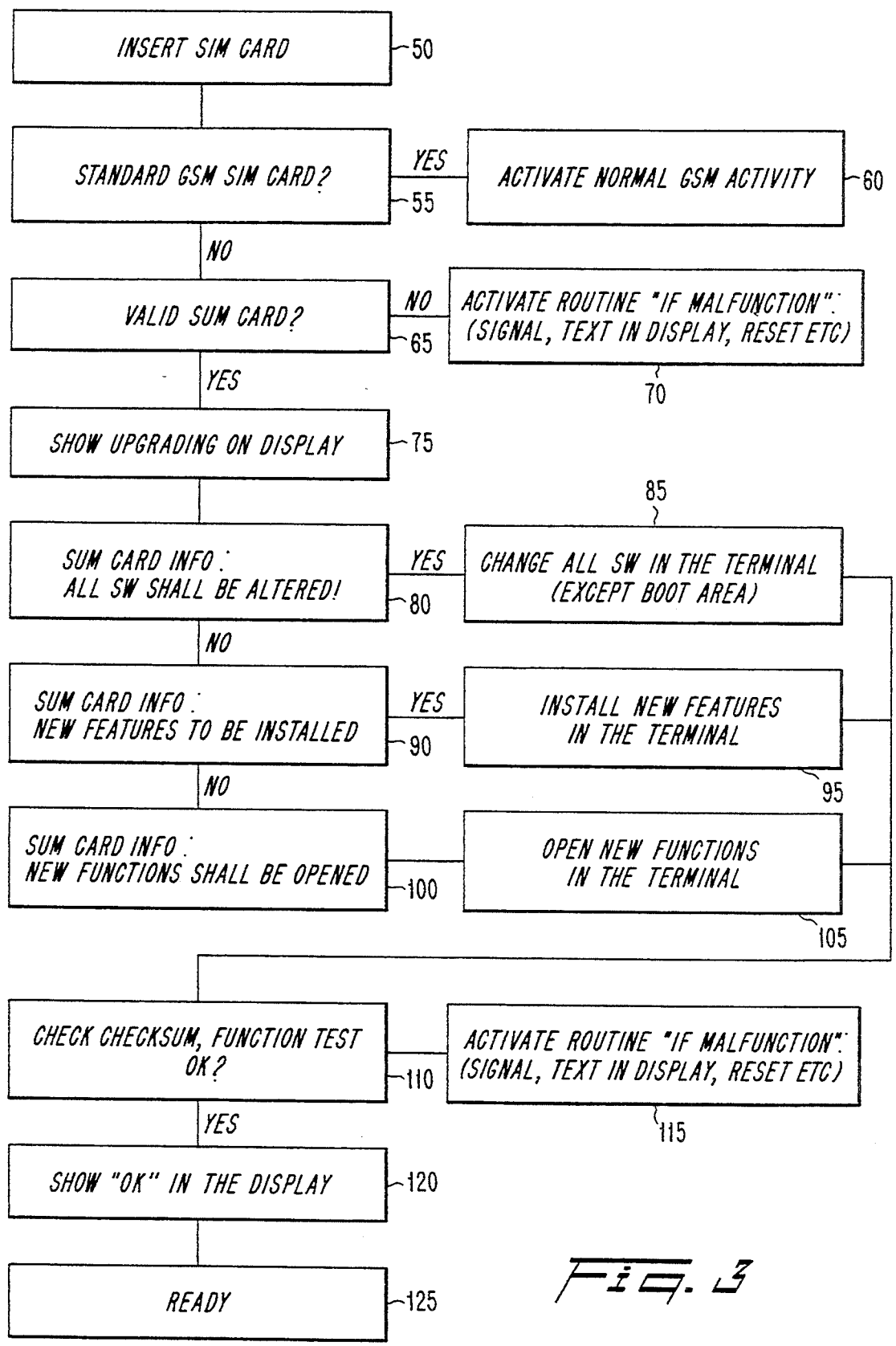
FIG. 3 is a flow chart of software provided in a mobile telephone according to one embodiment of the present invention.

FIG. 3 illustrates an exemplary software routine provided in the mobile telephone for performing the upgrading of the memory in the mobile telephone according to preferred embodiments of the present invention. It is believed that the detailed programming of the software routine provided within the mobile telephone memory is within the skill of the ordinary artisan once in possession of this disclosure. This software routine is stored in memory 15 and is executed by CPU 10.

To upgrade a mobile telephone, the subscriber inserts the temporary upgrading SUM card 22, 22' into the module card reader 20. When the mobile telephone is turned on, the CPU 10 begins execution of the software routine shown in FIG. 3.

At step 50, it is detected whether a module card of some type has been inserted by the user. At step 55, it is detected whether the module card is a standard GSM SIM card for validating the subscription and authenticating the subscriber. If so, step 60 activates normal GSM network activities. If the module card installed is not a standard GSM SIM card, it is determined whether the module card is valid for upgrading purposes from the information stored in identification area 26 (step 65). If the card installed is not valid for upgrading purposes, the error routine "if malfunction" to handle malfunctions is activated in step 70. The error routine signals the malfunction, provides the appropriate text in the display 5 and re-sets the telephone. Other functions appropriate to the error routine could also be performed as desired.

The functions described for steps 55 and 65 may be performed in a number of ways. For example, the CPU 10 may assume that the module card detected is a SIM card. When attempting to contact the card, the CPU 10 will get no usable information from the card if the assumption is incorrect and the card is in fact a SUM card. So the test at step 55 will return a "no". The CPU 10 will then assume that the card is a valid SUM card. At step 65, when reading identification data in the SUM memory 15', the CPU 10 will get data to compare with data in the memory 15 of the telephone. If the data from the card is found in a list of allowed data, the SUM card is valid for upgrading purposes. If not, the card is not a valid SUM card. The list of allowed identification data can be altered by upgrading the telephone memory in accordance with the methods and apparatus disclosed herein.

If the SUM card is valid for upgrading, the upgrading functions would be displayed on the display 5 at step 75.

If SUM card information is detected which indicates that the software in the mobile terminal is to be changed, for example, for providing solutions to software bugs, it is displayed on display 5 that "all software shall be altered" at step 80. The routine then changes all the software in the mobile terminal except that in the boot area in step 85 from information provided in the upgrading software stored in the SUM card.

If the answer at step 80 is no, it is detected at step 90 whether new features are to be installed in the mobile telephone. If so, the appropriate display is presented on the mobile telephone in display 5, and control proceeds to step 95. At step 95, the new features are installed in the mobile terminal from information provided in the upgrading software stored in the SUM card.

If the answer at step 90 is no, it is detected at step 100 whether new functions are to be opened in the mobile telephone. Using this function of the SUM card, it would be possible to allow user access to functions provided in the mobile telephone at the time of manufacture which are not automatically activated but for which a password is required to initiate activation of such functions. The SUM card could be used according to this embodiment to provide the password to the mobile terminal which would allow the user to access the previously installed functions. At step 105, the new functions would be open at the mobile terminal.

Although shown in FIG. 3 that the three functions of the SUM card, that is, to change the software in the mobile terminal, to add new features or to open functions in the mobile terminal, are shown as alternatives, it is within the skill of the ordinary artisan to provide all three functions or any combination of the three functions in the single SUM card once in possession of this disclosure. Appropriate changes to the control software is within the skill of the ordinary artisan once in possession of the present disclosure.

After steps 85, 95 and 105, control passes to step 110 in which an error checking routine is performed. The error checking routine checks the check sum and function test of the mobile terminal. The error checking routine at step 110 is used to determine whether any errors in transmission have been made in the data transmitted from the SUM card. This can be done for example, by the CPU 225 confirming data it receives from CPU 10 against data stored in memory 15'. Alternatively, the CPU 10 can check for errors itself. If errors are detected, the backup memory described above is used since the backup memory includes only verified copies of the verified versions of the different information blocks in the memory. This routine overrides the information in the normal memory area with the information in the backup area. In particular, if an error is detected, control passes to step 115 at which point the error "if malfunction" routine is entered. This error routine signals the malfunction by providing the appropriate text in the display 5 and re-sets the mobile telephone.

If the error checking routine at step 110 is clear, "OK" is shown in the display at step 120 indicating transmission has been successfully completed. At step 125, the mobile telephone is ready for use.

Although the above embodiment is described with respect to certain areas of the memory, other information stored in the memory may be upgraded using the SUM card according to the present invention. In addition, other features may be added to existing mobile telephones using the SUM card of the present invention as such other features and functions are developed and become available.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. An apparatus for upgrading existing software in a mobile telephone, the mobile telephone having a main memory, said apparatus comprising:
   a module reader provided in the mobile telephone;
   a software upgrading module card, said card comprising:
      means for temporarily connecting said card to the mobile telephone by insertion into said module reader; and
      means for storing upgrading software to be transmitted into the main memory in the mobile telephone, said upgrading software comprising controlling software for controlling operation of the mobile telephone;
   means provided in the mobile telephone for transmitting said upgrading software into the main memory; and
   wherein said upgrading software further comprises:
      identification data for identifying the software upgrading module card and the mobile telephone;
      warranty data for providing warranty information on the upgrading software and the software upgrading module card;
      function data for upgrading a plurality of mobile telephone functions;
      feature data for allowing access to a plurality of mobile telephone features;
      timing data for defining a useful life of said mobile telephone features;
      type data for identifying types of data stored in the software upgrading module card; and
      checksum data for verifying transmission of the upgrading software into the main memory.

2. The apparatus according to claim 1, wherein the mobile telephone comprises a backup memory area for storing verified versions of information stored in the main memory during transmitting of said upgrading software into the main memory.

3. The apparatus according to claim 1, wherein said means for transmitting said upgrading software comprises means for changing software in the main memory in the mobile telephone from information provided in said upgrading software stored in said software upgrading module card.

4. The apparatus according to claim 1, wherein said means for transmitting said upgrading software comprises means for installing new features in the mobile telephone from information provided in said upgrading software stored in said software upgrading module card.

5. The apparatus according to claim 1, wherein said means for transmitting said upgrading software comprises means for allowing access to existing but previously inaccessible functions in the mobile telephone from information provided in said upgrading software stored in said software upgrading module card.

6. The apparatus according to claim 1, wherein said means for transmitting said software comprises means for performing an error routine if said software upgrading module card is not valid for upgrading the mobile telephone.

7. The apparatus according to claim 1, wherein said means for transmitting said upgrading software comprises means for performing an error routine if the transmission from said software upgrading module card includes an error.

8. The apparatus according to claim 1, wherein said software upgrading module card comprises a microprocessor connected to said means for storing for verifying upgrading of the mobile telephone.

9. The apparatus according to claim 1, wherein said software upgrading module card comprises a microprocessor, connected to said means for storing, for checking the accuracy of the software transmitted into the main memory in the mobile telephone.

10. The apparatus according to claim 1, wherein said software upgrading module card comprises a clock and a power source for providing power to said clock, said clock providing means for limiting a useful life of the software upgrading module card.

11. A method of upgrading a mobile telephone comprising the steps of:
  temporarily inserting a software upgrading module card in a module card reader of the mobile telephone;
  transmitting upgrading controlling software in a memory provided in the mobile telephone from the controlling software stored in a memory provided in the software upgrading module card, said controlling software for controlling operation of the mobile telephone;
  storing identification data in the memory of the software upgrading module card for identifying the software upgrading module card and the mobile telephone;
  storing warranty data in the memory of the software upgrading module card for providing warranty information on the software upgrading module card and on the software in the memory of the software upgrading module card;
  inputting timing data into the memory of the mobile telephone for defining a useful life of a plurality of mobile telephone features;
  storing type data in the memory of the software upgrading module card for identifying types of data stored in the memory of the software upgrading module card; and
  inputting checksum data into the memory of the mobile telephone for verifying the upgrading of the software stored in the memory of the mobile telephone.

12. The method according to claim 11, wherein the step of transmitting upgrading software comprises the step of inputting changed software into the memory of the mobile telephone.

13. The method according to claim 11, wherein the step of transmitting upgrading software comprises the step of inputting new features into the memory of the mobile telephone.

14. The method according to claim 11, wherein the step of transmitting upgrading software comprises the step of inputting new functions into the memory of the mobile telephone.

15. The method according to claim 11, wherein the step of transmitting upgrading software in the memory of the mobile telephone is performed by software provided in the mobile telephone.

16. The method according to claim 11, wherein the step of transmitting upgrading software in the memory of the mobile telephone comprises performing an error routine in the event that the software upgrading module card is not valid for upgrading.

17. The method according to claim 11, wherein the step of transmitting upgrading software in the memory of the mobile telephone comprises performing an error routine in the event that a faulty transmission from the software upgrading module card is detected.

18. A method for upgrading a mobile telephone comprising the steps of:
  detecting whether a temporary upgrading software module card is inserted in a module card reader of the mobile telephone;
  if yes, transmitting upgrading controlling software in a memory provided in the mobile telephone from the controlling software stored in a memory provided in the temporary upgrading software upgrading module card, said controlling software for controlling operation of the mobile telephone;
  storing identification data in the memory of the software upgrading module card for identifying the software upgrading module card and the mobile telephone;
  storing warranty data in the memory of the software upgrading module card for providing warranty information on the software upgrading module card and on the software in the memory of the software upgrading module card;
  inputting timing data into the memory of the mobile telephone for defining a useful life of a plurality of mobile telephone features;
  storing type data in the memory of the software upgrading module card for identifying types of data stored in the memory of the software upgrading module card; and
  inputting checksum data into the memory of the mobile telephone for verifying the upgrading of the software stored in the memory of the mobile telephone.

19. The method according to claim 18, wherein the step of transmitting upgrading software comprises the step of inputting new software into the memory of the mobile telephone.

20. The method according to claim 18, wherein the step of transmitting upgrading software comprises the step of inputting new features into the memory of the mobile telephone.

21. The method according to claim 18, wherein the step of transmitting upgrading software comprises the step of inputting new functions into the memory of the mobile telephone.

22. The method according to claim 18, wherein the step of transmitting upgrading software in the memory of the mobile telephone is performed by software provided in the mobile telephone.

23. The method according to claim 18, wherein the step of transmitting upgrading software in the memory of the mobile telephone comprises performing an error routine in the event that the software upgrading module card is not valid for upgrading.

* * * * *